US008937947B2

United States Patent
Phan et al.

(10) Patent No.: US 8,937,947 B2
(45) Date of Patent: Jan. 20, 2015

(54) MULTICASTING TECHNIQUE FOR SCALABLY ENCODED MEDIA LAYERS

(75) Inventors: Mai-Anh Phan, Herzogenrath (DE); Jörg Huschke, Aachen (DE); Markus Kampmann, Aachen (DE); Thorsten Lohmar, Aachen (DE); Thomas Rusert, Kistsa (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 346 days.

(21) Appl. No.: 13/262,398

(22) PCT Filed: Apr. 2, 2009

(86) PCT No.: PCT/EP2009/002437
§ 371 (c)(1),
(2), (4) Date: Dec. 5, 2011

(87) PCT Pub. No.: WO2010/112046
PCT Pub. Date: Oct. 7, 2010

(65) Prior Publication Data
US 2012/0093153 A1 Apr. 19, 2012

(51) Int. Cl.
*H04L 12/28* (2006.01)
*H04L 12/18* (2006.01)

(52) U.S. Cl.
CPC .................................. *H04L 12/189* (2013.01)
USPC ........................................................ 370/390

(58) Field of Classification Search
USPC ............ 370/360, 477; 380/42, 278; 386/324; 375/E7.025, E7.198; 709/225; 725/148; 726/26
See application file for complete search history.

(56) References Cited

U.S. PATENT DOCUMENTS

| 7,130,473 B2 * | 10/2006 | Wu et al. ................. 382/238 |
| 2006/0221896 A1 * | 10/2006 | Vaittinen et al. ........... 370/328 |
| 2008/0045228 A1 * | 2/2008 | Zhang et al. ................ 455/450 |
| 2010/0238994 A1 * | 9/2010 | Cakareski et al. ....... 375/240.01 |

(Continued)

FOREIGN PATENT DOCUMENTS

| EP | 1729535 A1 * | 12/2006 | ............... H04Q 7/38 |
| WO | 2005/006596 A1 | 1/2005 | |

(Continued)

OTHER PUBLICATIONS

Xylomenos, G. et al. "Reducing the Transmission Power Requirements of the Multimedia Broadcast/Multicast Service." 16th 1st Mobile and Wireless Communications Summit, Budapest, Hungary, Jul. 1-5, 2007.

(Continued)

*Primary Examiner* — Phuongchau Ba Nguyen
(74) *Attorney, Agent, or Firm* — Coats & Bennett, PLLC

(57) ABSTRACT

A technique for distributing in a multicasting network media content via two or more media layers is described. The media layers are hierarchically arranged in accordance with a scalable coding protocol such as the Scalable Video Coding (SVC) protocol. In a method implementation of this technique, in a first step a first number of media recipients for a first media layer that is transmitted via a first bearer of the multicasting network is determined. Then, a second bearer of the multicasting network for at least one second media layer is selected taking into account the first number and a hierarchical relationship between the first media layer and the second media layer.

18 Claims, 10 Drawing Sheets

(56) References Cited

U.S. PATENT DOCUMENTS

2011/0319011 A1 12/2011 Dong et al.
2012/0093153 A1* 4/2012 Phan et al. .................. 370/390

FOREIGN PATENT DOCUMENTS

WO      WO 2005/006596 A1 *  1/2005  ............... H04B 7/26
WO         2008/015476 A1     2/2008

OTHER PUBLICATIONS

Schierl, T. et al. "Mobile Video Transmission Using Scalable Video Coding." IEEE Transactions on Circuits and Systems for Video Technology, vol. 17, No. 9, Sep. 2007.

Hellge, C. et al. "3GPP MBMS Mobile-TV Services using H.264/AVC Temporal Scalability and Layered Transmission." 15th IEEE International Conference on Image Processing, San Diego, CA, USA, Oct. 12-15, 2008.

3, Bamboo Mediacasting, "Multiple Traffic Bearers for an MBMS Bearer Service", 3GPP TSG SA WG2 Architecture—S2#55, Busan, South Korea, Oct. 23, 2006, pp. 1-4, S2-063517, 3GPP.

European Telecommunications Standards Institute, "Universal Mobile Telecommunications System (UMTS); Introduction of the Multimedia Broadcast/Multicast Service (MBMS) in the Radio Access Network (RAN); Stage 2 (3GPP TS 25.346 version 6.11.0 Release 6)" Technical Specification, ETSI TS 125 346 V6.11.0, Jun. 1, 2007, pp. 1-62, ETSI, France.

3RD Generation Partnership Project, "Universal Mobile Telecommunications System (UMTS); Radio Resource Control (RRC); Protocol specification", 3GPP TS 25.331 V8.4.0, Sep. 1, 2008, pp. 1-1543, 3GPP, France.

* cited by examiner

MULTICASTING TECHNIQUE FOR SCALABLY ENCODED MEDIA LAYERS

TECHNICAL FIELD

The present disclosure generally relates to a technique for distributing media content such as video, audio or multimedia content. In particular, the disclosure is directed to distributing in a multicasting network media content via two or more media layers, wherein the media layers are hierarchically arranged in accordance with a scalable coding protocol.

BACKGROUND

Modern media content distribution systems such as mobile video transmission systems are becoming increasingly popular. Bitstream scalability is a desirable feature in such systems. An encoded media bitstream is generally called scalable when parts of the bitstream can be removed so that the resulting sub-bitstream is still decodable by a target decoder. The media content of the sub-bitstream can be reconstructed at a quality that is less than that of the original bitstream, but still high when considering the resulting reduction of transmission and storage resources. Bitstreams that do not have these properties are also referred to as single-layer bitstreams.

Scalable Video Coding (SVC) is one solution to the scalability needs posed by the characteristics of video transmission systems. The SVC standard as specified in Annex G of the H.264/Advcanced Video Coding (AVC) specification allows the construction of bitstreams that contain scaling sub-bitstreams conforming to H.264/AVC. H.264/AVC is a video compression standard equivalent to the Moving Pictures Expert Group (MPEG)-4 AVC (MPEG-4 AVC) standard.

The SVC standard encompasses different scalability concepts as described, for example, in H. Schwarz et al., "*Overview of the Scalable Video Coding Extension of the H.264/AVC standard*", IEEE *Transactions on Circuits and Systems for Video Technology*", Vol. 17, No. 9, September 2007. For spatial and quality bitstream scalability, i.e. the generation of a sub-bitstream with lower spatial resolution or quality than the original bitstream, Network Abstraction Layer (NAL) units are removed from the bitstream when deriving the sub-bitstream. In this case, inter-layer prediction, i.e., the prediction of the higher spatial resolution or quality bitstream based on information contained in the lower spatial resolution or quality bitstream, is used for efficient encoding. For temporal bitstream scalability, i.e., the generation of a sub-bitstream with a lower temporal sampling rate than the original bitstream, complete access units are removed from the bitstream when deriving the sub-bitstream. An access unit is defined as a set of consecutive NAL units with specific properties. In the case of temporal bitstream scalability, high-level syntax and inter prediction reference pictures in the bitstream are constructed accordingly.

In the SVC standard, the sub-bitstream having a lower temporal sampling rate, lower spatial resolution or lower quality is referred to as Base Layer (BL) sub-bitstream, while the higher temporal sampling rate, higher spatial resolution or higher quality sub-bitstream is referred to as Enhancement Layer (EL) sub-bitstream. In scenarios with multiple sub-bitstreams of, for example, different higher spatial resolutions, two or more EL sub-bitstreams may be provided in total. Each sub-bitstream can be interpreted as constituting a separate media layer.

An image of an SVC video image sequence is represented as so-called "frame" (i.e., as an encoded representation of this image). Each SVC sub-bitstream comprises a sequence of so called SVC "sub-frames". Each SVC sub-frame constitutes either a full SVC frame or a fraction of a SVC frame. In other words, each SVC frame is either represented as a single data item (i.e., one BL "sub-frame" or one EL "sub-frame") or is sub-divided in at least two separate data items, i.e., in one BL "sub-frame" containing only the BL information associated with the respective frame and (at least) one EL "sub-frame" containing the EL information associated with the respective frame.

The scalability feature introduced by the SVC standard allows for a bitstream adaptation dependent on, for example, decoder capabilities, display resolutions and available transmission bit rates. If only the BL sub-frames are decoded, the video content can be rendered for example at a basis resolution or quality (e.g., at Quarter Video Graphics Array, or QVGA, resolution). If, on the other hand, both the BL and the EL sub-frames are decoded, then the video content can be rendered at a higher resolution or quality (e.g., at VGA resolution).

G. Xylomenos et al., "Reducing the Transmission Power Requirements of the Multimedia Broadcast/Multicast Service", in Proceedings of the IST Mobile & Wireless Communications Summit 2007, suggest distributing scalably encoded media layers in a multicasting network via the Multimedia Broadcast and Multicast Service (MBMS). MBMS was specified in Universal Mobile Telecommunication System (UMTS) Release 6 in order to support efficient delivery of identical media content from one source to multiple media recipients. With the introduction of a new Point-to-Multipoint (PTM) bearer, the unicast or Point-to-Point (PTP) solution in UMTS was extended by multicast and broadcast capabilities, thus enabling a virtually unlimited number of recipients to simultaneously receive the same media content on common radio resources.

In contrast to the PTP bearer, the PTM bearer does not support channel quality feedback from the recipients. As a result, transmit power as well as the Modulation and Coding Scheme (MCS) are both statically configured. This static approach implies that the PTM bearer leads to a waste of radio resources if there are no or only a few recipients in a content distribution area interested in the same service. Therefore, it is also possible to deploy the PTP transmission mode in MBMS to exploit the advantages of link adaptation.

In enhanced MBMS (eMBMS), it is also possible to deploy an adaptive PTM (aPTM) transmission mode which combines the advantages of simultaneous reception on common resources by multiple recipients and link adaptation. In the adaptive PTM mode, the PTM bearer is used and supports link adaptation based on channel quality feedback and Hybrid Automatic Repeat request (HARQ) status reports from multiple recipients. Since the amount of feedback increases with the number of interested users while the link adaptation gains are reduced, the adaptive PTM mode is particularly appropriate for a relatively small MBMS recipient group. The controlling node will thus select an appropriate bearer type depending on the number of recipients interested in a certain media content.

For the transmission of scalably encoded media layers, G. Xylomenos et al. propose selecting an appropriate bearer type for each media layer individually and assigning a separate MBMS group to each media layer. The bearer type selection is based on the number of recipients interested in a specific media layer and thus requires counting for each media layer the recipients that have requested the specific media layer. The resulting counting procedures can become time consuming and additionally consume hardware resources. While not discussed by G. Xylomenos et al., resource consumption would be particularly high in cases in which the counting procedures rely on a request/response messaging scheme with each individual recipient.

SUMMARY

Accordingly, a technique is needed for more efficiently controlling the distribution of media layers conforming to a scalable coding protocol in a multicasting network.

According to a first aspect, a method of distributing in a multicasting network media content via two or more media layers is provided, wherein the media layers are hierarchically arranged in accordance with a scalable coding protocol. The method comprises determining a first number of media recipients for a first media layer, the first media layer being transmitted via a first bearer of the multicasting network, and selecting a second bearer of the multicasting network for at least one second media layer taking into account the first number and a hierarchical relationship between the first media layer and the second media layer. As understood herein, media content comprises various content types, including video content, audio content, text content, multimedia content, and so on.

The hierarchical relationship between the first media layer and the at least one second media layer may be indicative of the fact that the first media layer is a higher media layer and the at least one second media layer a lower media layer below the first media layer (or vice versa). From the hierarchical relationship, a priori information may be derived that permits a more efficient bearer selection process.

When evaluating the hierarchical relationship, multiple second media layers below or above the first media layer may be identified, and the resulting bearer selection may apply to one, more or all of these second media layers.

The number of media recipients receiving the first media layer and the hierarchical relationship between the first media layer and the second media layer can be exploited as a priori information for selecting the second bearer for the second media layer without (or at least with reduced) counting efforts for the second media layer. For example, a second number of media recipients receiving the second media layer may be determined taking into account the first number of media recipients of the first layer (and, if required, the hierarchical relationship between the first media layer and the second media layer). The second bearer may then be selected dependent on the second number of media recipients thus determined.

The first or any other number of media recipients receiving the first or any other media layer may be determined in various ways. For example, the number could be determined by counting. The counting procedure could be based on a request/response scheme according to which a counting request is transmitted to the media recipients (i.e., via a broadcast, multicast or unicast communication) and the resulting counting responses are counted. As understood herein, the term counting also comprises a scenario in which the media recipients are programmed to respond to a counting request only with a certain probability, so that the number of media recipients is determined by counting the actual counting response and multiplying the result with a factor indicative of this probability. Moreover, the counting may also be performed without relying on counting requests (e.g., in an event-based manner by keeping track of media recipients joining or leaving a specific media layer).

Any of the counting requests may be associated with at least one of an indicator of a particular media layer and a counting sequence indicator (such a as counting sequence number or a counting sequence period). The media layer indicator may trigger the transmission of a counting response for the indicated media layer only (and, optionally, taking into account a certain probability factor). The counting sequence indicator, which may optionally be transmitted together with the media layer indicator, permits the media recipient to distinguish between consecutive counting procedures as will be discussed in more detail below. Initiation of a counting procedure may be triggered by different events. As an example, the counting request is transmitted upon expiry of a timer.

In one implementation, the second number of media recipients receiving the second media layer is derived from the first number without or at least with limited further counting. For example, the second number can be estimated from the first number. In certain cases in which the second media layer is lower than the first media layer, the minimum of the second number may, for example, be estimated to equal the first number, and the second bearer may be selected accordingly (as will be explained below with reference to FIG. 5).

In another variant, the second number may be determined by adding to the first number a third number of media recipients receiving the at least one second media layer but not the first media layer (a typical scenario in cases in which the at least one second media layer is lower than the first media layer, see again FIG. 5). The third number can be determined by counting the media recipients receiving the at least one second media layer but not the first media layer. As a result, not the total number of media recipients receiving the second media layer has to be counted, but only a fraction thereof. Similar to the variant for determining the first number discussed above, at least one of the second and third number may be determined by transmitting a counting request to the media recipients (and evaluating the resulting counting responses), or in any other way.

The bearers for any of the first and second media layer may be selected from various bearer types including a feedback bearer on which recipient feedback is obtained (such as a PTP bearer or an adaptive PTM bearer with recipient feedback), a non-feedback bearer without recipient feedback (such as a conventional PTM bearer), and an idle mode (in which no bearer is established for the individual media layer). The feedback bearer may be configured to comprise a shared feedback channel (that is shared by all or a subset of recipients) or a dedicated feedback channel for each individual recipient.

If any of the first and second bearer is the feedback bearer, the corresponding first or second number of media recipients may be determined without relying on a counting request/response messaging mechanism. For example, any of the first and second number of media recipients may be determined by counting per media layer feedback connections to the specific media recipients via the feedback bearer. Counting of the feedback connections may be performed in the form of an event-based counting (e.g., upon establishment of a new feedback bearer to a joining media recipient or the termination of an existing feedback bearer to a leaving media recipient).

Selecting the second bearer may comprise a switching for the at least one second media layer, that is hierarchically lower than the first media layer, from the feedback bearer to the non-feedback bearer if the first number fulfils an up-switching criterion. On the other hand, if the second number fulfills a down-switching criterion, a switching from the non-feedback bearer to the feedback bearer may occur for the hierarchically lower second media layer. Moreover, selecting the second bearer may comprise a switching for the at least one second media layer, that is hierarchically higher than the first media layer, from the non-feedback bearer to the feedback bearer (or the idle mode) if the first number fulfills the down-switching criterion.

According to a still further implementation, the highest media layer transmitted via the non-feedback bearer is selected as the first media layer. Then, as a next step, the first number of media recipients receiving the selected first media layer is determined by the counting the media recipients of the first media layer. It should be noted that in order to determine the first number of media recipients, not every media recipient has to be counted individually. Rather, the counting may be restricted to a subset of the first number of media recipients and the remaining subset may be determined by other techniques discussed herein.

If it is determined that the first number fulfills an up-switching criterion, and the at least one second media layer is hierarchically lower than the first media layer, the current second bearer is maintained. If, on the other hand, the first number fulfills a down-switching criterion, the method may comprise counting the second number taking into account the first number and selecting the next highest media layer transmitted via the non-feedback bearer as the next first media layer. The counting efforts in relation to the media recipients of lower media layers may thus be reduced by refraining from counting such media recipients that receive one or more higher media layers and have thus already been counted earlier.

It may also be determined if the first number fulfills an on-switching criterion. Should this be the case, the second bearer for the at least one second media layer, that is hierarchically lower than the first media layer, is switched from the idle mode to the non-feedback bearer, or the non-feedback bearer is maintained as the second bearer. If the first number fulfills an off-switching criterion, the second bearer for the at least one second media layer, that is hierarchically higher than the first media layer, is switched form the non-feedback bearer to the idle mode, or the idle mode is maintained.

According to a further aspect, a method of controlling in multicasting network the distribution of media content via two or more media layers is provided, wherein the media layers are hierarchically arranged in accordance with a scalable coding protocol. The method comprises receiving a counting request for a first media layer, the counting request being associated with a counting sequence indicator (e.g., a counting sequence number or period), evaluating if a counting response has been transmitted in response to an earlier counting request for a second media layer and associated with the same counting sequence indicator, and generating a counting response dependent on a result of the evaluation. The second media layer may be higher than the first media layer.

As a result of evaluating the counting sequence indicator, the number of counting responses transmitted for different media layers during one and the same counting procedure can be reduced. The corresponding reduction of counting responses will not deteriorate the counting result and any bearer selection responsive to the counting result, as the selection procedure may additionally be based on a priori information.

According to another aspect, a computer program product is provided. The computer program product comprises program code portions for performing one or more of the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a cellular telecommunications network or a wireless or wired Local Area Network (LAN).

According to a still further aspect, a device for controlling in a multicasting network the distribution of media content via two or more media layers is provided, wherein the media layers are hierarchically arranged in accordance with a scalable coding protocol. The device comprises a processor adapted to determine a number of media recipients for a first media layer, the first media layer being transmitted via a first bearer of the multicasting network, and a selector adapted to select a second bearer of the multicasting network for at least one second media layer taking into account the number of media recipients determined for the first media layer and a hierarchical relationship between the first media layer and the second media layer.

Still further, a device for controlling in a multicasting network the distribution of media content via two or more media layers is provided, wherein the media layers are hierarchically arranged in accordance with a scalable coding protocol. The device comprises an interface adapted to receive a counting request for a first media layer, the counting request being associated with a counting sequence indicator, a processor adapted to evaluate if a counting response has been transmitted in response to an earlier counting request for a second media layer and associated with the same counting sequence indicator, and a generator adapted to generate a counting response dependent on a result of the evaluation. The counting response may further be generated dependent on an additional probability factor as described above.

BRIEF DESCRIPTION OF THE DRAWINGS

In the following, the present technique will be described in more detail with reference to exemplary embodiments illustrated in the drawings, wherein FIG. 1 schematically illustrates an embodiment of a media content distribution system comprising a media server embodiment and a media client embodiment.

DETAILED DESCRIPTION

In the following description, for purposes of explanation and not limitation, specific details are set forth, such as specific device configurations and specific media content handling, storage and streaming scenarios in order to provide a thorough understanding of the technique disclosed herein. It will be apparent to one skilled in the art that the technique may be practiced in other embodiments that depart from these specific details. Moreover, while the following embodiments will primarily be described in relation to SVC and MBMS, it will be readily apparent that the techniques described herein may also be practiced in context with other encoding protocols and multicasting services. Furthermore, while in the following reference will be made to RTP-based sessions, the techniques discussed herein can also be implemented using other transport protocols.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in a computer processor and a memory coupled to the processor, wherein the memory stores one or more programs that perform the steps discussed herein when executed by the processor.

Figure 1:
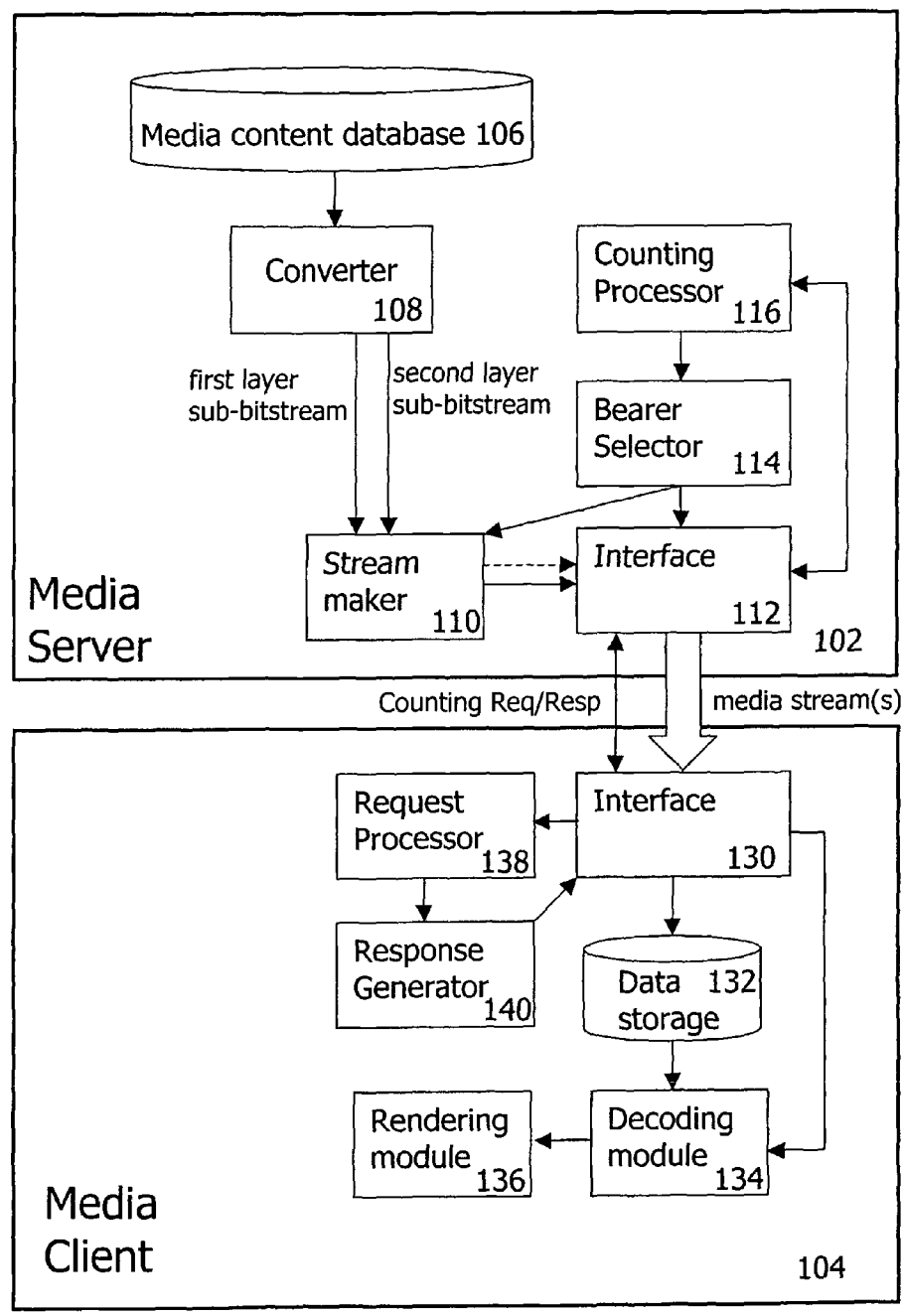

Reference is now made to FIG. 1, which shows an exemplary media content distribution system 100 with multicasting capabilities. The system 100 comprises a media server 102 as well as a media client 104 receiving layered media content from the media server 102. While the system 100 of FIG. 1 illustrates only a single media client 104, it will be appreciated that the media server 102 will in practice be configured to distribute media content to a plurality of media clients 104 simultaneously. Also, each media client 104 may be configured to receive media content from more than one media server 102.

The media server 102 has a media content database 106 with media content files that comprise data items encoded in accordance with a scalable coding protocol supported by the media client 104. The media content files may be stored in an MPEG4-compliant single-track or multi-track format. In the present embodiment, the media content files are video files compliant with a mobile television standard. Optionally, the media server 102 further comprises an interface (not shown) for receiving media content files. The received media content files may then be stored in the database 106 and retrieved at a later point in time. Alternatively, the received media content files may only be temporarily buffered in the database 106 or may even as a bitstream bypass the database 106, e.g. for live content delivery.

As shown in FIG. 1, the media server 102 further comprises a converter 108 adapted to read the encoded data items stored in the media content files of the database 106 and to generate two or more dedicated sub-bitstreams corresponding to two or more hierarchically arranged media layers of the scalable coding protocol. Each sub-bitstream comprises a continuous sequence of individual data items (e.g., media sub-frames).

The converter 108 is coupled to a stream maker 110. The stream maker 110 is configured to process the individual (and optionally encrypted) sub-bitstreams from the converter 108 dependent on the transmission configurations. In one transmission configuration, the two sub-bitstreams are combined to a single bitstream for being transmitted via a single media stream to the media client 104. In another transmission configuration, the two sub-bitstreams are delivered via individual media streams. As understood herein, a media stream comprises a bitstream or sub-bitstream for which an individual (e.g., RTP-based) session has been initiated between the media server 102 and the media client 104.

The bitstream or sub-bitstreams for the media layers output by the stream maker 110 are fed to an interface 112 of the media server 102. The interface 112 is configured to establish a media session with the media client 104 via a conventional multicast or broadcast (PTM), an adaptive PTM (aPTM) or a unicast (PTP) bearer. In a PTP scenario, the media server 102 will have a dedicated communication link with each media client as exemplarily shown for one media client 104 in FIG. 1. In a PTM (including adapted PTM) scenario, one or more additional media clients 104 will be coupled to the same PTM bearer.

The interface 112 is configured to transmit the media stream(s) together with session parameters (such as Session Description Protocol, or SDP, parameters) to the media client 104. The interface 112 further adds headers to the media stream such s as Internet Protocol (IP) headers, User Datagram Protocol (UDP) headers or RTP headers for the transmission to the media client 104.

It is important to note that in the present embodiment bearer selection is performed individually for each media layer. To this end, a bearer selector 114 is provided that is coupled to the stream maker 110 and the interface 112. The bearer selector 114 is configured to perform bearer selection based on, inter alia, the number of media recipients having requested or receiving an individual media layer. To this end, the bearer selector 114 is coupled to a counting processor 116 configured to perform a counting procedure with respect to the media recipients of an individual media layer.

Figure 2:
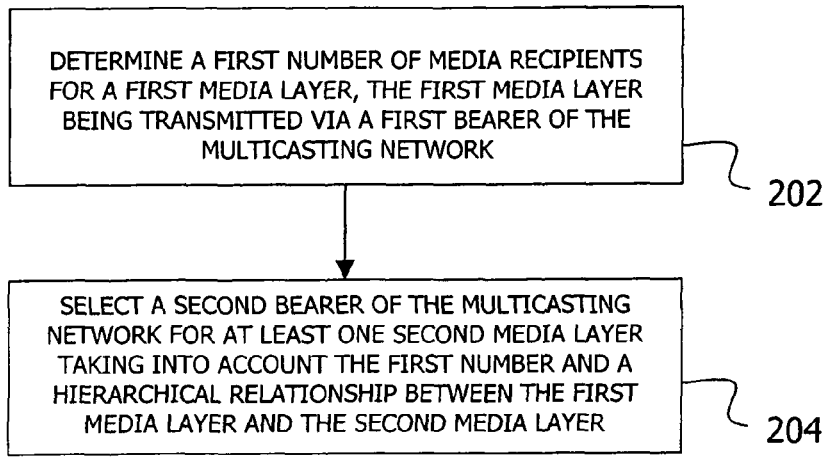
FIG. 2 is a schematic flow chart illustrating a first method embodiment.

As each counting procedure consumes computational resources of the counting processor 116 and, even more significantly (depending on the counting mechanism), resources on the air interface between the media server 102 and the media client 104 as well as computational resources of the media client 104), the counting processor 116 and the bearer selector 114 are configured to utilize locally available a priori information about the media layers to reduce the counting efforts. The corresponding cooperation of the counting processor 116 and the bearer selector 114 is schematically illustrated in the flow chart 200 of FIG. 2.

In a first step, the counting processor 116 determines a first number of media recipients for a first media layer transmitted (or about to be transmitted) from the media server 102 to a plurality of media clients 104. The first media layer is transmitted via a first bearer of the multicasting network. The first bearer can be any of a feedback bearer (PIP or adaptive PTM) and non-feedback bearer (conventional PTM). The number of media recipients for the first media layer can be determined by counting the media clients 104 interested in the first media layer. The counting may, for example, be based on a counting request/counting response messaging mechanism, and to this end the counting processor 116 is coupled to the interface 112 for triggering the transmission of counting requests and for being notified upon receipt of the resulting counting responses. If a feedback bearer is established, the counting processor 116 may in general determine the number of recipients by counting the dedicated communication links (i.e., without initiating counting requests/response messaging).

In a second step 204, the first number of media recipients determined by the counting processor 116 for the first media layer is communicated to the bearer selector 114. The bearer selector 114 then selects a second bearer (e.g., any of a feedback and a non-feedback bearer) for at least one second media layer taking into account the first number of media recipients determined by the counting processor 116 for the first media layer. The selection of the second bearer is additionally based to on an evaluation of the hierarchical relationship between the first media layer and the second media layer (which is a priori known the media server 102). The corresponding selection result is then communicated from the bearer selector 114 to the interface 112, which selects the second bearer for the second media layer accordingly.

Since the bearer selector 114 selects the second bearer for the second media layer at least partially based on a priori information, the counting efforts for the second media layer are typically reduced. In certain scenarios it may, for example, be possible to completely or at least partially omit a request/response-based counting procedure for the second media layer.

Turning now to the media client 104 of FIG. 1, the one or more media streams distributed by the media server 102 are received together with the session parameters at an interface 130. The interface 130 first removes the IP headers, UDP headers and RTP headers that were solely used for transmission purposes on the transmission link between the media server 102 and the media client 104.

As shown in FIG. 1, the interface 130 is coupled to a data storage 132. The data storage 132 is configured to store the (optionally decrypted) data items in an appropriate media file format such as an MPEG-4 compliant single-track or multi-track format. The data items may later on be read from the resulting media content file in the data storage 132 and passed to a decoding module 134. Moreover, the data storage 132 may also be bypassed and the one or more media streams received at the interface 130 could be directly fed to the decoding module 134.

The decoding module 134 is adapted to decode the data items and to pass the decoded data items to a rendering module 136 (e.g., a graphics card) for being finally output by at least one output unit (not shown). The output unit (e.g., a display device) may be part of the media client 104 or connectable to the media client 104.

Figure 3:
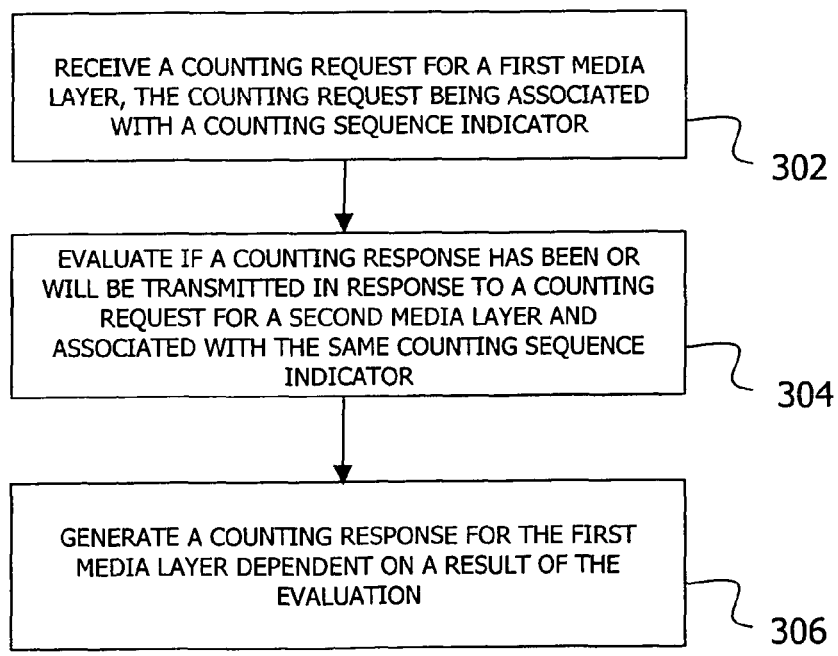
FIG. 3 is a schematic flow chart illustrating a second method embodiment.

As has been explained above with respect to the media server 102, bearer selection is based on the number of media recipients receiving an individual media layer as determined, for example, using a counting request/counting response messaging mechanism. To make the media client 104 compatible with such a mechanism, a request processor 138 as well as a response generator 140 are provided. The request processor 138 is configured to receive and process counting requests received from the media server 102. The response generator 140, on the other hand, is configured to generate layer-individual counting responses. The cooperation of the request processor 138 and the response generator 140 will now be described in more detail with reference to the exemplary flow chart 300 of FIG. 3.

In a first step 302, a counting request indicative of the first media layer is received by the request processor 138 via the interface 130. The counting request comprises a counting sequence indicator. The counting sequence indicator may, for example, inform the media client 104 that the present counting request pertains to one of a sequence of consecutive counting periods. The duration of a counting period may be determined by a timer of the media server 102 (not shown in FIG. 1). In other words, the media server 102 may be adapted to transmit a counting request upon each expiry of the timer.

In a next step 304 the request processor 138 evaluates if the media client 104 has already transmitted earlier a counting response to a counting request for a second media layer and associated with the same counting sequence indicator. Depending on the result of the evaluation in step 304, the request processor 138 triggers the response generator 140 to generate, in step 306, a counting response for the first media layer.

If, for example, the media client 104 has already responded to a counting request for a higher media layer, the request processor 138 will refrain from triggering the response generator 140 to generate a counting response also for a counting request for a lower media layer. As a result, the media client 104 will in total transmit fewer counting responses, which saves battery power and air interface resources. While thus fewer counting responses will be transmitted to the media server 102, this will not deteriorate the efficiency of the bearer selection process as the media server 102 is capable of evaluating supplemental a priori information. In the present example, the a priori information will indicate that the media client 104 receiving the higher media layer will necessarily also receive the lower media layer due to the hierarchical arrangement of the media layers.

Figure 4:
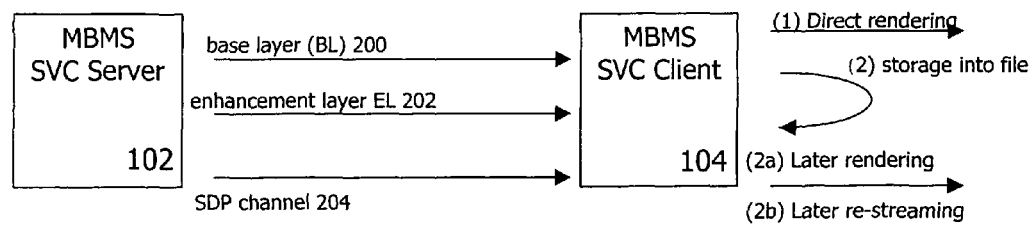
FIG. 4 is a schematic diagram illustrating a transmission of multiple media layers via dedicated media streams from an MBMS media server to an MBMS media client in an SVC embodiment.

Several details and further advantages of the technique presented herein will now be described in the context of an exemplary SVC-based MBMS scenario. FIG. 4 shows the corresponding media content distribution from an SVC server 102 to an SVC client 104 acting as media recipient. The internal configurations of the SVC server 102 and SVC client 104 are not shown in FIG. 4 but may generally correspond to the configurations of the media server 102 and the media client 104, respectively, of FIG. 1. In the present MBMS scenario, the components of the media server 102 may essentially be located in a core network, except for the interface 112 (with MBMS support), the bearer selector 114 and the counting processor 116, which may be installed on a Radio Network Controller (RNC). The media client 104 may be a UMTS User Equipment (UE), such as a mobile telephone, a laptop or a stationary Personal Computer (PC).

As illustrated in FIG. 4, two dedicated media layers 200, 202 stretch from the SVC server 102 to the SVC client 104. A first media layer 200 contains the lower layer sub-frames (i.e., the BL data items), while the second media layer 202 comprises the higher layer sub-frames (i.e., the EL data items). It will be appreciated that in more complex transmission scenarios, two or more ELs may be present as generally shown in FIG. 5A.

Figure 5A:
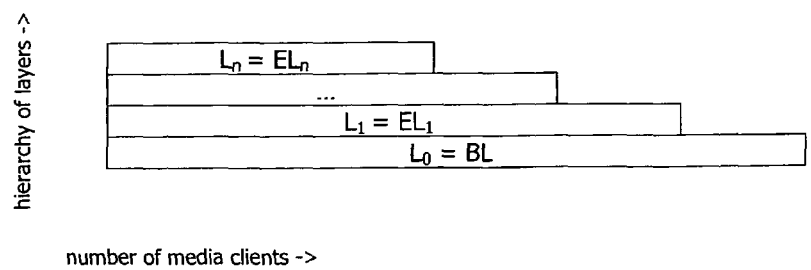
FIGS. 5A to C are schematic diagrams illustrating a general relationship between hierarchically arranged media layers and the related numbers of media recipients.

FIG. 5A graphically illustrates the number of media recipients per media layer for hierarchically arranged media layers. Due to the hierarchical arrangement, the number of media recipients will in most cases monotonously decrease from the lowest media layer (BL) to the highest media layer ($EL_n$). FIG. 5A shows that the number of media recipients receiving media layer $L_i$ is at least as large as the number of media recipients receiving media layer $L_{i+1}$. This a priori knowledge is a result of the fact that all media recipients receiving media layer $L_{i+1}$ (i.e., the (i+1)th EL) also need to receive all lower layers in order to decode and render the additional information provided by media layer $L_{i+1}$.

In the present MBMS scenario, a single MBMS multicasting group may be assigned to the plurality of media layers associated with a specific content service. Additionally, unequal error protection may be applied to the different media layers. For example, the BL, which provides the essential media content, requires a higher error protection standard to be received by the majority of interested media clients 104. On the other hand, less robust error protection may be applied to the ELs so that reception of the ELs may be restricted by the channel conditions experienced by the individual media clients 104. For example, if PTP or adaptive PTM bearers are used for the ELs, the MCS could be configured to reach a minimum transmit rate, restrict the number of HARQ retransmissions run Radio Link Control (RLC) in unacknowledged mode. Based on the channel quality experienced by a specific media client 104, the RNC may also decide to completely stop the transmission of an EL.

Returning to FIG. 4, there additionally is a session control channel 204 between the SVC server 102 and the SVC client 104. The channel 204 is used to signal SDP compliant session parameters out-of-band to the SVC client 104. It should be noted that instead of using the session control channel 204, the session parameters could also be transmitted in-band.

Upon reception of the two media layers 200, 202, there exist two major use-cases for handling the media content by the SVC client 104. As illustrated in FIG. 4, the first use-case pertains to a direct rendering of the media content, and the second use-case is the storage of the media content for later rendering or later re-streaming. The first two use cases have already been briefly discussed in context with the rendering module 136 of the media client 104 shown in FIG. 1.

In the following, exemplary modes of operation of the SVC servers 102 and the SVC clients 104 of FIGS. 1 and 4 will be described to provide an understanding how knowledge in relation to a number of media recipients of a first media layer is exploited to perform bearer selection for a second media layer at reduced counting efforts. In the description that follows, it will be differentiated between the case in which a subset containing only media layers transmitted via a feedback bearer, i.e., PTP or adaptive PTM bearers, is considered (FIGS. 6 and 7) and the case in which a subset containing media layers transmitted via a non-feedback bearer, i.e., a conventional PTM bearer without recipient feedback, (FIGS. 8 to 11) is considered.

It will be assumed here that a switching from a PTP or adaptive PTM bearer to a conventional PTM bearer will occur for a specific media layer as soon as the number of media recipients for this media layer exceeds a predefined up-switching threshold for PTM transmission (and vice versa). It is further assumed that the up-switching thresholds for the individual media layers are all equal or that at least $th_k > th_{k-1}$, with $th_i$ being the up-switching threshold associated with media layer $L_k$. It should be noted that instead of thresholds, other switching criteria could also be evaluated.

Figure 5B:
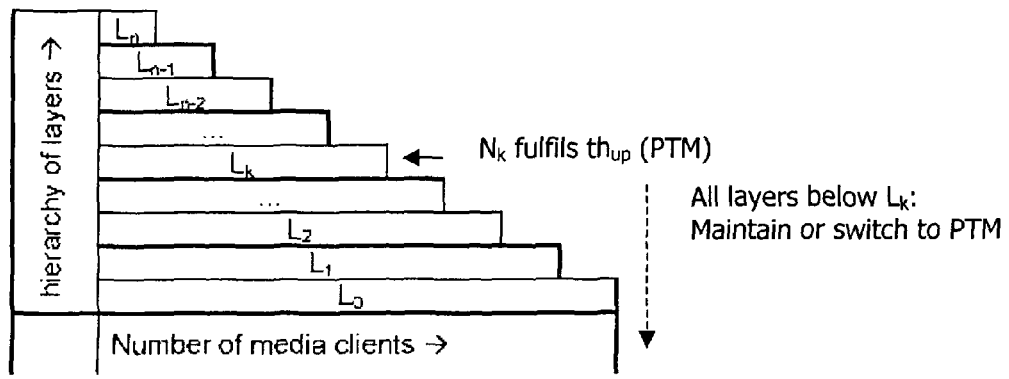
Figure 5C:
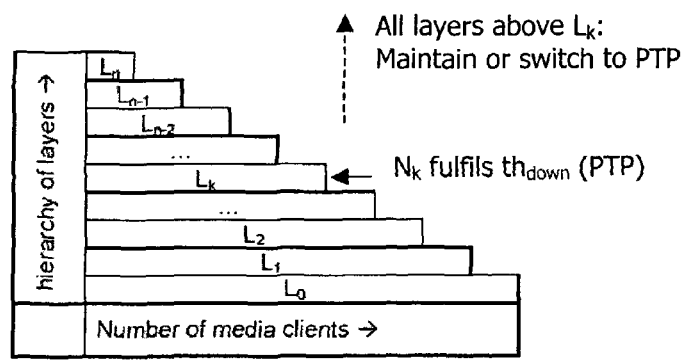

If the SVC server 102 determines that the number of recipients for media layer $L_k$ requires the conventional PTM bearer, the up-switching criterion based on $th_k$ implies that all media layers below $L_k$ will also be transmitted via (and if required, switched to) the PTM bearer. This scenario is schematically illustrated in FIG. 5B. If, on the other hand, it is determined that the number of recipients of media layer $L_k$ requires a PTP or adaptive PTM bearer, respectively, all layers above $L_k$ will also be transmitted (and, if required, switched to) the PTP or adaptive PTM bearer, respectively, as shown in FIG. 5C. These general principle will now be described with reference to some more specific embodiments.

For media layers transmitted in either PTP or adaptive PTM mode, no counting requests have to be transmitted to the media clients 104 in order to determine the number of recipients for the specific media layer. Rather, the controlling network node such as the RNC can determine the number of media recipients for each media layer by keeping track of the media clients 104 leaving or joining a specific media layer as will now be explained with reference to FIGS. 6 and 7 (in which only media layers are transmitted in PTP or adaptive PTM mode are considered).

Figure 6:
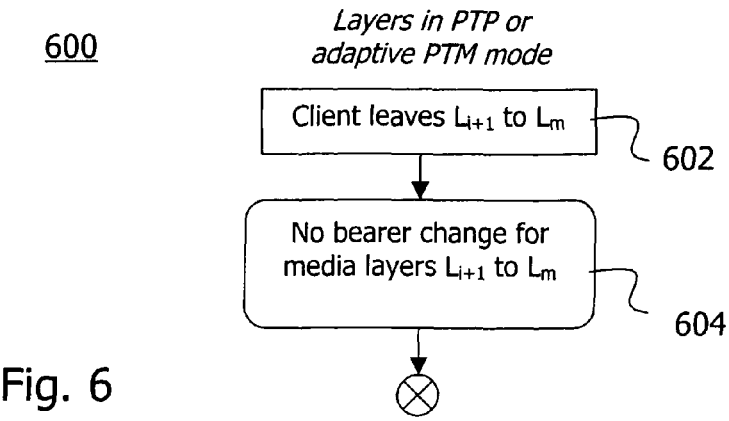
FIGS. 6 to 11 schematically illustrate flowcharts of further method embodiments.

Flow chart 600 of FIG. 6 shows the scenario in which a specific media client 104 leaves layers $L_{i+1}$ to $L_m$ (step 602). Assuming that the up-switching from a PTP or adaptive PTM bearer to a conventional PTM bearer without feedback is performed for a specific layer $L_k$ if the number of recipients $N_k$ exceeds an up-switching threshold $th_{up}$, the leaving of layers $L_{i+1}$ to $L_m$ implies that $N_k$ will still remain below $th_{up}$ ($N_k \leq th_{up}$). Based on this a priori information, it becomes apparent that no specific counting procedures have to be initiated for media layers $L_{i+1}$ to $L_m$ as no bearer change will occur (step 604).

Figure 7A:
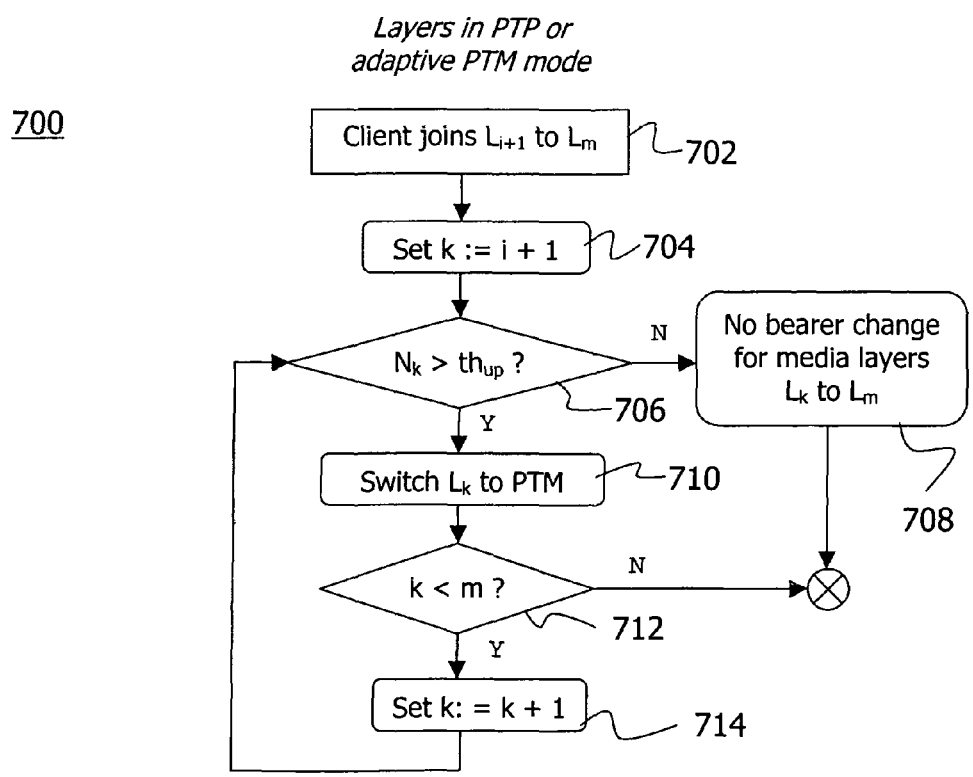

Flow chart 700 of FIG. 7A illustrates a bottom-up scenario in which a specific media client 104 joins layers $L_{i+1}$ to $L_m$ (step 702). After a loop counter k has been set to i+1 in step 704, it is determined in step 706 whether the number of recipients $N_k$ of the specific media layer $L_k$ exceeds the up-switching threshold $th_{up}$ (step 706).

If the up-switching threshold $th_{up}$ is not exceeded for media layer $L_k$, the a priori information implies that also the higher media layers $L_{k+1}$ to $L_m$ will not have enough recipients for an up-switching to the PTM bearer (as illustrated in FIGS. 5A and 5C). Therefore, it is decided in step 708 that no bearer change for media layers $L_k$ to $L_m$ is required and that for this reason no additional counting procedures have to be performed. After step 708, the procedure terminates.

If it is determined in step 708 that the up-switching threshold $th_{up}$ for media layer $L_k$ is actually exceeded, media layer $L_k$ is switched to the PTM bearer in step 710 and the procedure continues with step 712. In step 712 it is determined if the loop counter indicates that the highest media layer $L_m$ has already been reached. Should this be the case, the procedure terminates. Otherwise, the loop counter k is incremented and the procedures loops back to step 706.

Figure 7B:
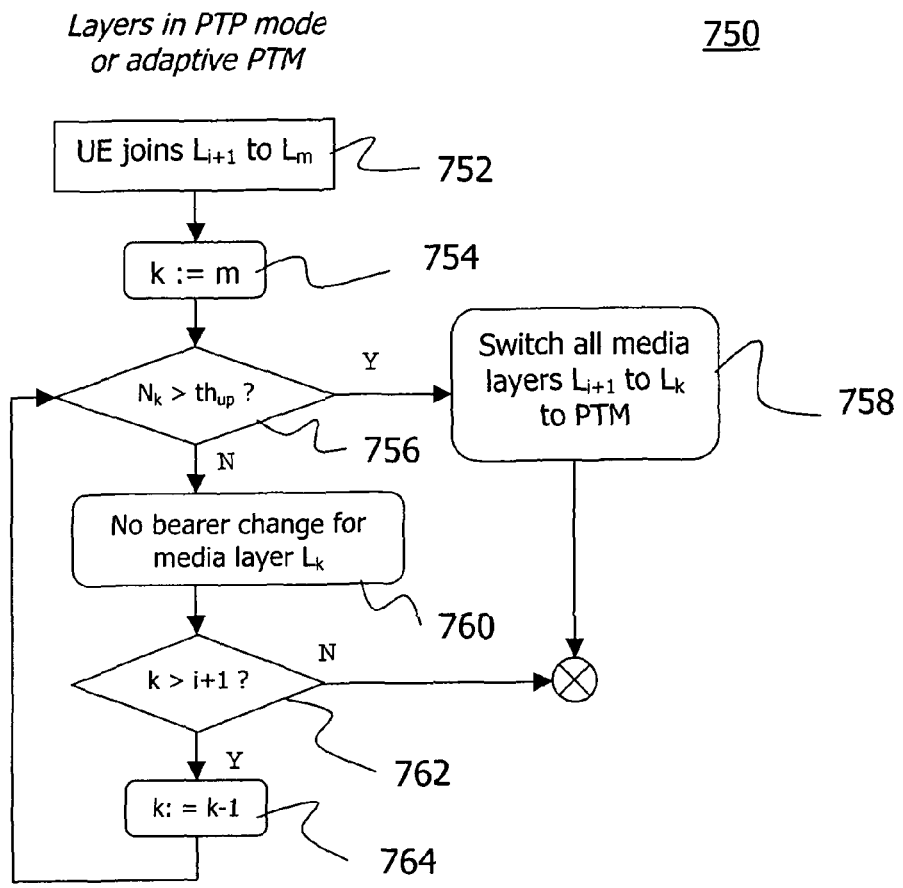

Flow chart 750 of FIG. 7B illustrates a top-down scenario in which a specific media client 104 also joins layers $L_{i+1}$ to $L_m$ (step 752). After a loop counter k has been set to m in step 754, it is determined in step 756 whether the number of recipients $N_k$ of the specific media layer $L_k$ exceeds the up-switching threshold $th_{up}$ (step 756).

Figure 8:
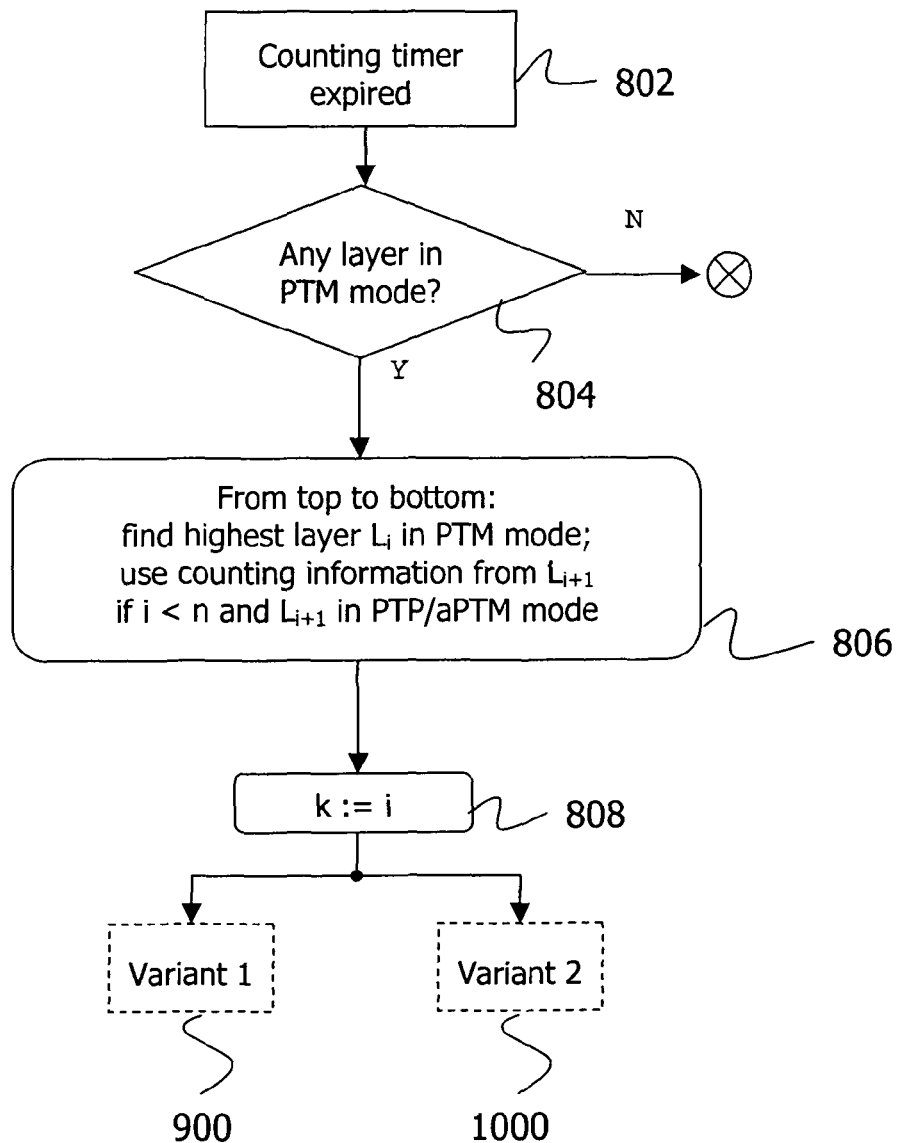

If the up-switching threshold $th_{up}$ is exceeded for media layer $L_k$, the a priori information implies that also the lower media layers $L_{i+1}$ to $L_{k-}$ will have enough recipients for an up-switching to the PTM bearer (as illustrated in FIGS. 5A and 5B). Therefore, it is decided in step 758 that media layers $L_{i+1}$ to $L_{k-}$ are switched to the PTM bearer. Step 758, the procedure terminates. If, on the other hand, it is determined in step 756 that the up-switching threshold $th_{up}$ for media layer $L_k$ is not exceeded, no bearer change for media layer $L_k$ is required (step 760), and the procedure continues with step 762. In step 762, it is determined if the loop counter k indicates that the lowest media layer $L_{i+1}$ has already been reached. Should this be the case, the procedure terminates. Otherwise, the loop counter k is decremented in step 764 and the procedures loops back to step 756. p FIG. 8 illustrates a flow chart 800 of a method embodiment that may be performed by the SVC server 102 in case at least one media layer is transmitted on a conventional PTM bearer without recipient feedback. The procedure illustrated in FIG. 8 is periodically performed upon expiry of a counting timer in step 802. The counting timer defines the time interval between two subsequent counting procedures and can be set according to the actual or expected number of media recipients as well as their expected joining and leaving behavior.

Upon expiry of the counting timer in step 802, the procedure continues with step 804 to determine if any of the media layers is transmitted via a PTM bearer (i.e., in the PTM mode). If it is determined in step 404 that all media layers are either transmitted on a PTP or an adaptive PTM bearer, the procedure ends until the next expiry of the counting timer. As used herein, a PTM bearer without the prefix "adapted" will relate to a conventional PTM bearer without recipient feedback.

If, on the other hand, at least one media layer is transmitted via a PTM bearer, the procedure continues with step 806. In step 806, the highest media layer $L_i$ with $0<i<n$ distributed via the PTM mode is determined. The parameter n designates the highest media layer currently offered by the SVC server 102. If it is determined that the highest layer $L_i$ transmitted in the PTM mode is not the highest layer (i.e., i<n) and if knowledge is available that the next highest media layer is transmitted in PTP or adaptive PTM mode, then this a priori knowledge can be exploited for selecting the bearers of lower media layers.

The procedure continues with step 808, in which a loop counter k is set to i. From step 808, the procedure either branches to a first variant 900 or a second variant 1000. The two variants 900, 1000 basically differ in that the lower layers are either switched individually (variant 900) or jointly (variant 1000) to a new bearer.

The first variant 900 will now be explained in more detail with reference to FIG. 9. In step 902, the SVC server 102 broadcasts counting requests to all media recipients of media layer $L_k$. The counting requests comprise an indicator of media layer $L_k$ (to inform the media recipients that counting responses for this specific media layer are solicited) and additionally a counting sequence indicator (which may generally indicate how often the counting timer has already expired during an ongoing content distribution session).

The counting in step 902 will only involve the media recipients that have not yet been counted in upper layers $L_{k+1}$ as the media clients 104 are programmed not to respond with a counting response if they have already responded to a counting request for a higher media layer during the present counting period (as indicated by the counting sequence indicator). The corresponding operation of the media clients 104 has already been discussed above with reference to FIGS. 1 and 3. It should be noted that to save battery power, and uplink radio resources the media clients 104 may additionally be programmed to respond to a counting request only with a certain probability as described above.

Once it can be assumed that all counting requests for a specific counting period have fully been received, the remaining number $N_r$ of media recipients for media layer $L_k$ that have not yet responded in the present counting period is calculated by dividing the number of counting responses with an optional probability factor p<1. As a result, $N_k$ can be determined by adding to $N_{k+1}$ the number $N_r$ of media recipients receiving media layer $L_k$ but not receiving any upper media layer $L_{k+1}$ (i.e., $N_k=N_{k+1}+N_r$). As a result, the counting efforts for lower layers can be significantly reduced. It should be noted that the remaining number may be different in each layer (i.e., $N_k=N_{k+1}+N_{k,r}$).

In a next step 904, the number of media recipients $N_k$ is compared with a pre-defined down-switching threshold $th_{down}$. If it is determined that $N_k \geq th_{down}$, the procedure terminates and the present media layer $L_k$ as well as all media layers below media layer $L_k$ will remain being transmitted via the PTM bearer. If, however, $N_k<th_{down}$, the procedure continues with step 906 to switch media layer $L_k$ from the PTM bearer to any one of a PTP bearer an adaptive PTM bearer. Upon switching media layer $L_k$ from the PTM bearer to the PTP bearer or adaptive PTM bearer, a layer-specific error protection scheme is configured In general, a robustness of the error protection may decrease as k increases (i.e., for a higher media layers).

From step 906, the procedure proceeds with step 908. In step 908 it is determined if media layer $L_k$ is already the lowest layer (BL). Once the lowest media layer is reached, the procedure terminates (while the counting timer re-started in step 802 keeps running). If, on the other hand, it is determined in step 908 that there exists at least one media layer below layer $L_k$, then the loop counter k is decremented in step 910 and the procedure loops back to step 902.

In the variant 900 discussed above with reference to FIG. 9, the SVC server 102 transmits counting requests for each media layer individually and also performs switching decisions for each media layer individually. According to the alternative variant 1000 illustrated in FIG. 10, the bearer switching for a plurality of media layers is bundled to reduce the signaling overhead. With reference to FIG. 10, steps 1002 and 1004 correspond to steps 902 and 904, respectively. Moreover, steps 1010 and 1012 correspond to steps 908 and 910, respectively. In order to enable a collective switching, steps 1002, 1004, 1010 and 1012 are performed repeatedly as long as the number of media recipients $N_k$ of the corresponding media layer $L_k$ fulfills the down-switching criterion (i.e., $N_k \leq th_{down}$).

Once it is determined in step 1004 that the down-switching criterion is no longer fulfilled, the procedure branches to step 1006 to determine if steps 1002, 1004, 1010 and 1012 have been passed at least once (corresponding to a down-switching decision for at least one media layer $L_k$). If it is determined that k=i (meaning that step 1002, 1004, 1010, 1012 have not been passed at least once) the procedure terminates and the present bearers are kept for media layer $L_k$ as well as all lower media layers. If, on the other hand, the loop has been executed at least once (or the lowest layer has been reached in step 1010), the procedures continues with step 1008. In step 1008, all media layers $L_m$ with m=k+1 ... i are collectively switched to any of the PTP bearer and the adaptive PTM bearer, respectively. Then, the procedure terminates.

Figure 9:
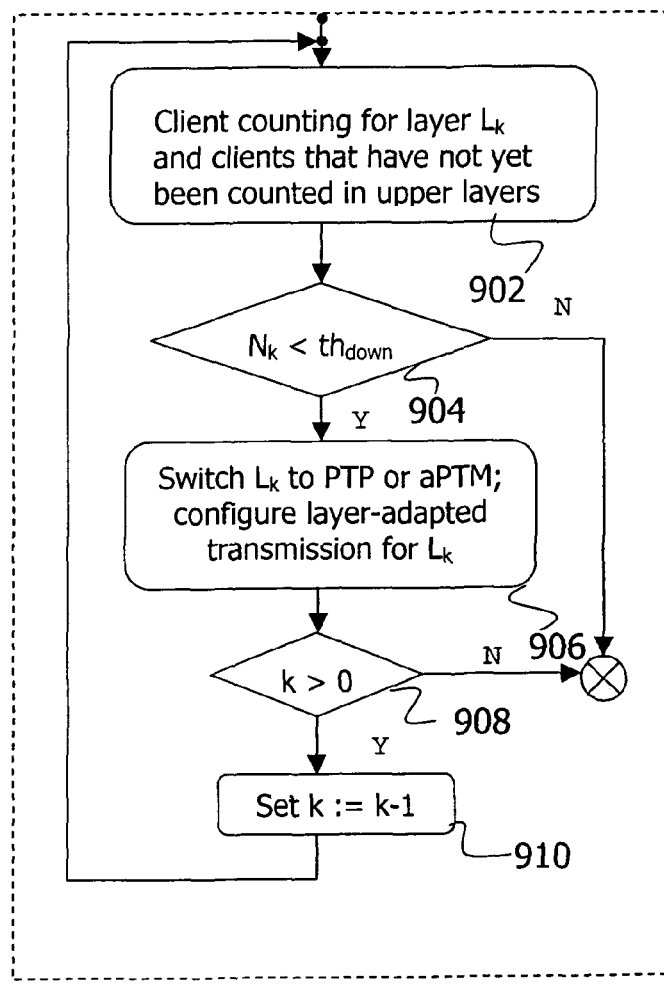
Figure 10:
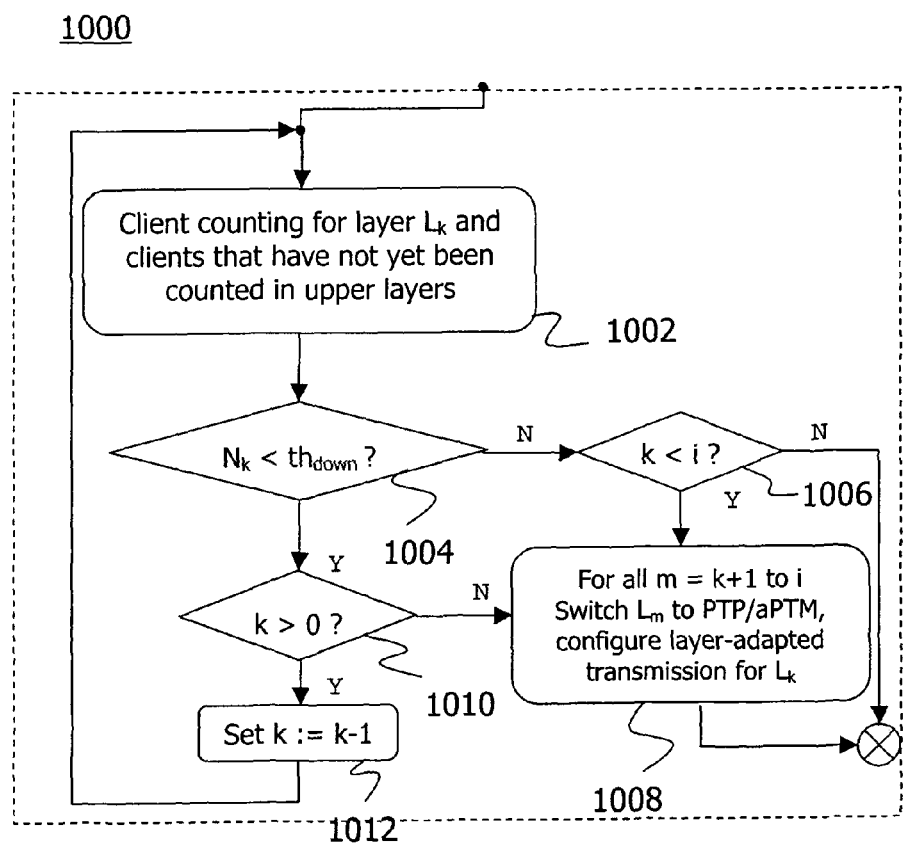

In the embodiment depicted in FIGS. 8 to 10, the option of switching from a PTM bearer to either one of a PTP or adaptive PTM bearer has been investigated. In the embodiment that will now be described with reference to FIG. 11, a scenario will be investigated in which only PTM bearers are supported, but in which the delivery of individual media layers on individual PTM bearers may be switched off (i.e., the PTM bearer for a specific media layer may be switched into an idle mode).

In this embodiment, counting information will be used to decide whether to switch an individual media layer on or off. In an embodiment in which no PTP bearer is supported, an on-switching threshold th>0 for each media layer $L_i$ with i≥0 (i.e., for each media layer including the BL) can be implemented with $th_{i+1} \geq th_i$. Also in this embodiment, counting information determined for an upper media layer can be re-used for a lower media layer to reduce counting efforts. If, for example $th_{i+1}=10$, $N_{i+1}=5$ and $th_i=8$ (implying that $N_i \geq 5$), the counting procedures with advanced counting features as illustrated in FIGS. 9 and 10 (steps 902 and 1002, respectively) can be applied for media layer $L_i$.

If in an PTM-only scenario a media layer shall be delivered for any recipient density larger than 0 (i.e., $th_i=0$), information from already examined media layers can only scarcely be re-used. It might even be sufficient to perform polling instead of counting. In the present user detection/counting context, a polling request is addressed to all the recipients of a specific media layer in the same way as a counting request. Polling is used to detect if there is at least one recipient receiving the specific layer in a specific content distribution area (i.e., in a specific cell). Thus, the identity of the recipient has no relevance in the polling context. As a consequence, the recipients may transmit their polling responses on the Random Access Channel (RACH) without changing from an idle to a connected mode. Furthermore, RACH collisions do not deteriorate the result of the polling response as long as any polling response can be detected by the uplink receiver. Additionally, the polling can be stopped as soon as the controlling node receives at least one polling response. This means that the other recipients do not have to send polling response, which results in significantly reduced radio resource consumption in the uplink direction.

If it is decided to transmit media layer $L_i$, then all lower media layers are transmitted as well, and no polling or counting is required for this lower media layers. If media layers $L_i$ to $L_m$ are not delivered and need to be switched-on, counting for media layer $L_m$ is sufficient, and all these media layers may automatically be switched-on together. In case several media layers in PTM mode are switched-off during a specific counting or polling period, it is also possible to apply the two switching variants discussed above with reference to FIGS. 9 and 10 (i.e., to switch the media layers individually after each respective counting operation, or to bundle the switching procedures).

Figure 11:
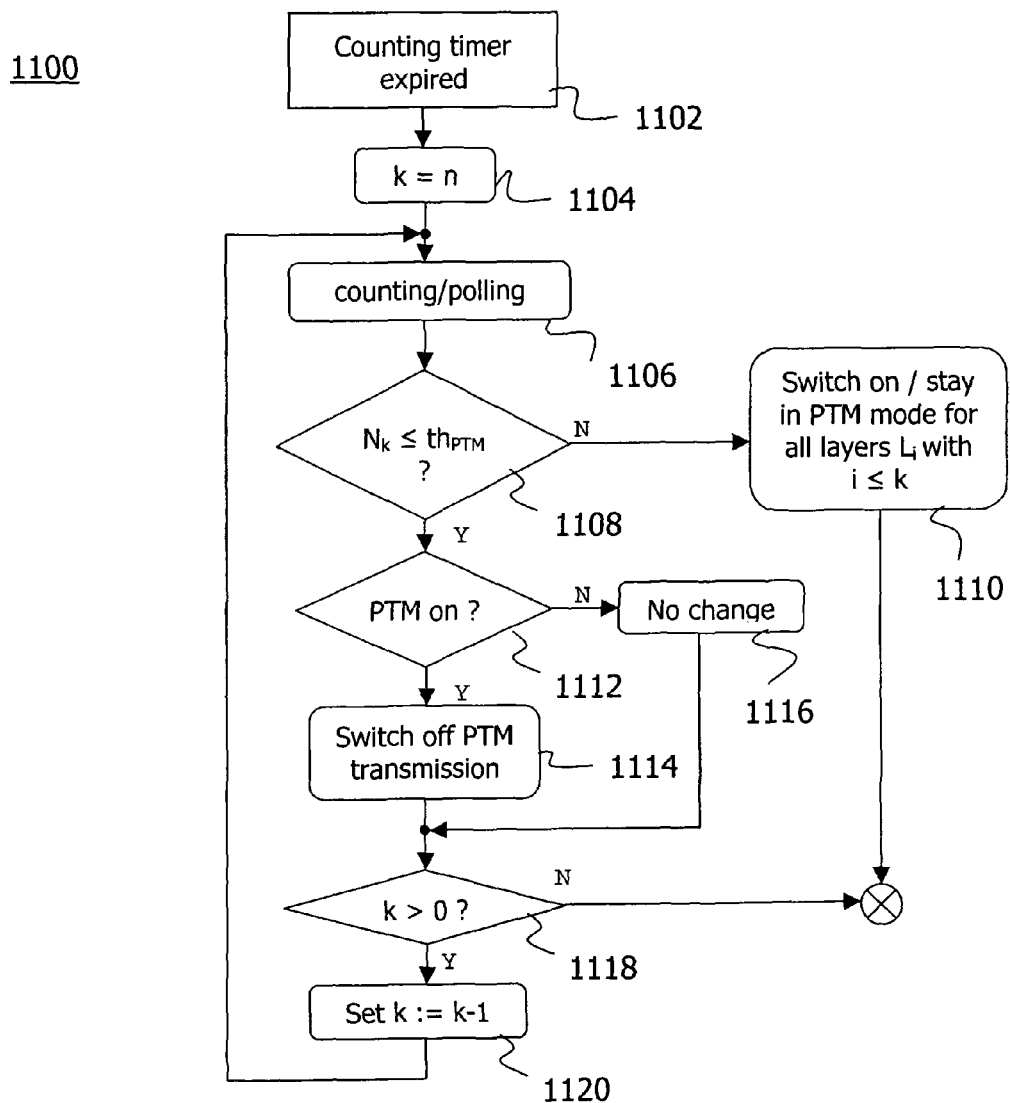

FIG. 11 illustrates a flow chart 1100 of a method embodiment for an exemplary PTM-only scenario. Counting/polling is again performed during predefined counting/polling intervals defined by a counting timer. Upon expiry of the counting timer in step 1102, a loop counter k is set to its maximum value n (with n corresponding to the total number of media layers available for transmission). Then, in step 1106, a counting/polling is performed as discussed above with reference to steps 902 and 1002 in FIGS. 9 and 10.

If it is determined that the number $N_k$ of media recipients receiving media layer $L_k$ exceeds the on-switching threshold, the method proceeds to step 1110. In step 1110, all media layers $L_i$ with $i \leq k$ are switched-on or, if they are already switched-on, remain in the PTM mode. The procedure then terminates.

If, however, it is determined in step 1108 that the off-switching threshold is not exceeded, it is checked in step 1112 if the present media layer $L_k$ is delivered via a PTM bearer. If this is the case, the corresponding PTM bearer is switched-off in step 1114. Otherwise, no change is made (step 1112). The procedure then continues with step 1116 to determine if the lowest media layer (BL) has already been investigated. Should this be the case (k=0), the procedure terminates. Otherwise, the loop counter k is decremented in step 1118 and the procedure loops back to step 1106 to perform the counting/polling for media layer $L_{k-1}$.

As has become apparent from the above embodiments, the techniques discussed herein re-utilize previously gathered counting information from media layers as well as a priori information about hierarchical relationships to determine if the counting efforts for other media layers may be reduced. In certain scenarios, less counting requests will be transmitted over the air interface to the media clients 104. Moreover, in certain situations the media clients 104 will transmit less counting responses in case two or more media layers are consumed. In total, processing and power resources on both the server side and the client side can be reduced. This is of particular advantage for mobile clients such as mobile telephones relying on battery power. Moreover, the air interface is in certain scenarios disburdened from downlink and uplink signaling overhead. In an MBMS scenario, this also mitigates the collision probability for the RACH, which is of particular advantage especially for non-MBMS clients that want to initiate a specific service.

In the foregoing, principles, embodiments and various modes of implementing the techniques disclosed herein have exemplarily been described. However, the present invention should not be construed as being limited to the particular principles, embodiments and modes discussed above. Rather, it will be appreciated that variations and modifications may be made by a person skilled in the art without departing from the scope of the present invention as defined in the following claims.

The invention claimed is:

1. A method of distributing media content in a multicasting network via two or more media layers, wherein the media layers are hierarchically arranged in accordance with a scalable coding protocol, the method comprising:
   determining a first number of media recipients of a first media layer, wherein the first media layer is transmitted via a first bearer of the multicasting network;
   selecting a second bearer of the multicasting network for transmission of at least one second media layer, taking into account the first number and a hierarchical relationship between the first media layer and the at least one second media layer;
   determining a second number of media recipients of the at least one second media layer, taking into account the first number;
   wherein the second bearer is selected by also taking into account the second number.

2. The method of claim 1, wherein the first number is determined by counting the media recipients receiving the first media layer, and wherein the second number is determined by deriving the second number from the first number.

3. The method of claim 1, wherein determining the second number comprises adding to the first number a third number of media recipients that are recipients of the at least one second media layer but not the first media layer.

4. The method of claim 3, further comprising determining the third number by counting the media recipients receiving the at least one second media layer but not the first media layer.

5. The method of claim 1, wherein determining the first number comprises transmitting a counting request to the media recipients of the first media layer.

6. The method of claim 5, wherein the counting request is associated with at least one of an indicator of a particular media layer and a counting sequence indicator.

7. The method of claim 5, wherein transmission of the counting request is triggered by expiry of a timer.

8. The method of claim 1, further comprising, for any of the first and second media layers, maintaining, switching to one of, or switching between two of the following bearers:
   a feedback bearer on which recipient feedback is obtained;
   a non-feedback bearer without recipient feedback; and
   an idle mode.

9. The method of claim 8, wherein the feedback bearer is selected from a Point-to-Point bearer and a Point-to-Multipoint bearer with recipient feedback, and wherein the non-feedback bearer is a Point-to-Multipoint bearer without recipient feedback.

10. The method of claim 8, wherein, if the first or second bearer is the feedback bearer, determining the first or second number of media recipients comprises counting per media layer feedback connections to the media recipients via the feedback bearer.

11. The method of claim 10, wherein counting the feedback connections is performed as event-based counting upon establishment of a new feedback bearer or termination of an existing feedback bearer.

12. The method of claim 8, wherein selecting the second bearer comprises switching, for at least one second media layer hierarchically lower than the first media layer:
   from the feedback bearer to the non-feedback bearer, if the first number fulfils an up-switching criterion; or
   from the non-feedback bearer to the feedback bearer, if the second number fulfils a down-switching criterion.

13. The method of claim 8, wherein selecting the second bearer comprises switching, for at least one second media layer hierarchically higher than the first media layer, from the non-feedback bearer to the feedback bearer, if the first number fulfils a down-switching criterion.

14. The method of claim 8, further comprising
selecting the highest media layer transmitted via the non-feedback bearer as the first media layer; and
determining the first number by counting the media recipients of the selected first media layer.

15. The method of claim 14, further comprising:
if the first number fulfils an up-switching criterion and the at least one second media layer is hierarchically lower than the first media layer, maintaining the current second bearer; or
if the first number fulfils a down-switching criterion, counting the second number taking into account the first number and selecting a next highest media layer transmitted via the non-feedback bearer as the next first media layer.

16. The method of claim 14, further comprising:
if the first number fulfils an on-switching criterion and the at least one second media layer is hierarchically lower than the first media layer, switching the second bearer from the idle mode to the non-feedback bearer or maintaining the non-feedback bearer as the second bearer; or
if the first number fulfils an off-switching criterion and the second media layer is hierarchically higher than the first media layer, switching the second bearer from the non-feedback bearer to the idle mode, or maintaining the idle mode for the second bearer.

17. A computer program product that is stored on a non-transitory computer readable recording medium and that comprises program code portions that, when executed on a computing device, cause the computing device to distribute media content in a multicasting network via two or more media layers, wherein the media layers are hierarchically arranged in accordance with a scalable coding protocol, the program code portions causing the computing device to:
determine a first number of media recipients of a first media layer, wherein the first media layer is transmitted via a first bearer of the multicasting network; and
select a second bearer of the multicasting network for transmission of at least one second media layer, taking into account the first number and a hierarchical relationship between the first media layer and the second media layer;
determine a second number of media recipients of the at least one second media layer, taking into account the first number;
wherein the second bearer is selected by also taking into account the second number.

18. A device for controlling the distribution of media content in a multicasting network via two or more media layers, wherein the media layers are hierarchically arranged in accordance with a scalable coding protocol, the device comprising:
a processor circuit configured to determine a number of media recipients of a first media layer, wherein the first media layer is transmitted via a first bearer of the multicasting network;
a selector configured to select a second bearer of the multicasting network for transmission of at least one second media layer, taking into account the determined number of media recipients of the first media layer and a hierarchical relationship between the first media layer and the at least one second media layer;
wherein the processor circuit is further configured to determine a second number of media recipients of the at least one second media layer, taking into account the first number;
wherein the second bearer is selected by also taking into account the second number.

\* \* \* \* \*